United States Patent Office 3,484,423
Patented Dec. 16, 1969

---

3,484,423
HALOGENATED POLYMERS AND COPOLYMERS OF 4-METHYLPENTENE-1 AND 4-METHYLHEXENE-1
Paul Borzel, Elizabeth, and Joseph P. Kennedy, Cranford, N.J., assignors to Esso Research and Engineering Company, a corporation of Delaware
No Drawing. Filed Jan. 28, 1966, Ser. No. 523,576
Int. Cl. C08f 27/03
U.S. Cl. 260—88.2                    6 Claims

ABSTRACT OF THE DISCLOSURE

The invention consist of a process and resulting products for the halogenation of amorphous, soluble polymers and copolymers of 4-methylpentene-1 and 4-methylhexene-1 prepared by cationic polymerization of the respective monomers.

---

This invention relates to novel halogenated thermoplastic polymers. More particularly, this invention relates to halogenated thermoplastic polymers or copolymers of cationically polymerized 4-methylpentene-1, 4-methylhexene-1 and mixtures of 4-methylpentene-1 with 4-methylhexene-1 and to the processes for obtaining such polymers.

The production of normally solid polymers of olefins by superatmospheric polymerization with the aid of "Ziegler-type" catalysts is well known in the prior art, e.g. see Belgian Patent 538,782, Scientific American, September 1957, page 98 et seq., etc. These polymers are isotactic in nature (i.e. they have a high degree of crystallinity) and in the case of poly-(4-methylpentene-1) and poly-(4-methylhexene-1) and copolymers thereof, their crystallinity and structure render them generally insoluble in well-known solvents.

Such insolubility has been an obstacle to the homogeneous halogenation of these polymers (uniformly halogenated polymers are useful for flameproofing applications), since according to the prior art processes they may be halogenated by any of two methods:

The first prior art method involves the suspension of the polymer in a diluent and continuation of the halogenation as the halogenated polymers begin dissolving in the diluent at the expense of the unhalogenated polymer. This method is generally unsatisfactory since homogeneously halogenated products are not obtained unless substantially more than 50 wt. percent halogen is incorporated in the polymer. Polymers having more than 50 wt. percent halogen have very high density and are generally useless for applications demanding light weight plastics. Moreover, the suspension method operates by swelling (but not dissolving) the polymeric starting material and the halogenation then proceeds at the expense of the swollen polymeric starting materials as described above; it is immediately apparent that this type of reaction proceeds very slowly and entails expensive power and halogenation costs. See Journal of Polymer Science, vol. 55, pages 169–180 (1961).

The second prior art method is the powder method in which finely divided particles of the starting polymeric material are shaken in an atmosphere of halogen without solvent. This reaction is, however, highly exothermic and leads only to halogenation on the surface of the particles and the particles often char during the reaction, see Journal of Polymer Science, supra.

It has now been found that the difficulties described above may be overcome by halogenating amorphous, elastomeric cationically polymerized 4-methylpentene-1, 4-methylhexene-1 or copolymers thereof so as to obtain novel, high molecular weight halogenated thermoplastic polymers having structures heretofore unachieved in the prior art; moreover, these novel polymers are flameproof, clear and possess excellent physical and mechanical properties required during molding operations. This result is indeed surprising since the halogenation of similar cationically polymerized materials such as butyl rubber (copolymers of isobutylene with about 1% or less of isoprene) and polyisobutylene results in the severe degradation to low molecular weight oils during halogenation particularly where amounts of halogen over 3 to 4 wt. percent are combined with the polymer, see U.S. Patents 2,732,354; 2,804,448 and 2,944,578.

It is essential that the cationically polymerized starting materials, i.e. the amorphous elastomeric poly-(4-methylpentene-1), poly-(5-methylhexene-1) and copolymers thereof, be halogenated so as to obtain hard, flexible thermoplastic materials. It has been found that the initial polymers lose their elastomeric character only when over about 20 wt. percent of halogen, based on the weight of the halogenated polymer, is combined in the polymer. Preferably, the halogen content of the final polymer is in the range of about 25 to about 50 wt. percent, based on the weight of the halogenated polymer; if desired, the polymer may be halogenated up to 75 wt. percent or more although such large amounts of halogen are not necessary to impart flameproofing and thermoplasticity to the polymer. That the inclusion of over 20 wt. percent halogen in the cationically polymerized elastomeric starting material results in a thermoplastic polymer is quite surprising since polychloroprene which contains about 40 wt. percent chlorine, still retains its elastomeric character.

The solubility difference between the isotactic chlorine polymers to be halogenated by the prior art processes and the amorphous elastomeric materials to be halogenated by the present invention may be explained with reference to the following structures:

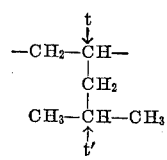

Repeating unit of isotactic "Ziegler-catalyzed" poly-(4-methylpentene-1)

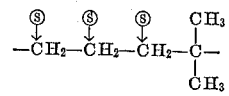

Repeating unit of amorphous elastomeric cationically polymerized (4-methylpentene-1)

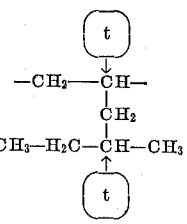

Repeating unit of isotactic "Ziegler" catalyzed polymerized (4-methylhexene-1)

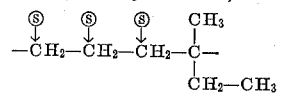

Repeating unit of amorphous elastomeric cationically polymerized (4-methylhexene-1)

The isotactic copolymers of 4-methylpentene-1 with 4-methylhexene-1 and the amorphous elastomeric copolymers of 4-methylpentene-1 with 4-methylhexene-1 have the same repeating units shown above for the homopolymers, respectively, although the sequential nature of the units in these copolymer backbones has not been fully determined at this time.

It is well known that in halogenation, the ease of hydrogen replacement with halogens is: tertiary>secondary>primary. Thus in the structural formulae halogenation of the isotactic polymers takes place predominantly at the (t) and (t') positions with a slight preference for the (t) position because of the steric hindrance effects; halogenation of the amorphous elastomeric cationically polymerized materials predominantly takes place at the (s) positions.

The starting materials for the purposes of this invention are poly-(4-methylpentene-1), poly-(3-methylhexene-1), and copolymers thereof prepared by cationic polymerization of the respective monomers. In contrast to their isotactic, crystalline counterparts (i.e. those prepared with "Ziegler catalysts"), the cationically polymerized materials are soluble in all the well-known solvents commonly employed in the halogenation of polymers. The cationically polymerized materials employed in this invention are old in the art and do not form any part of this invention; however, for the sake of completeness, a brief description of the process for cationically polymerizing 4-methylpentene-1, 4-methylhexene-1 and mixtures thereof is set forth below.

The monomer feed, i.e. 4-methylpentene-1, 4-methylhexene-1, or mixtures thereof, is first freed of significant amounts of molecular weight poisons such as normal diolefins, isodiolefins and normal monoolefins; a starting feed containing less than 300 p.p.m. of these poisons is generally suitable. The monomer feed is preferably diluted with 0.05–20 volumes, more preferably 2–7 volumes, of a low freezing, noncomplex-forming (with the catalyst) inert diluent and the mixture is then admitted into a suitable reactor. The inert diluent may be one which is a nonsolvent for the final polymer such as $C_1$–$C_4$ alkyl halides, e.g. methyl chloride, methylene chloride, ethyl chloride, ethylene chloride, methyl fluoride, ethyl fluoride, ethylene fluoride, difluoroethane, perfluoroethane, etc. and mixtures thereof. Alternatively, the inert diluent may be one which is a solvent for the final polymer such as a $C_4$–$C_{10}$ saturated hydrocarbon e.g. butane, pentane, hexane, isohexane, cyclohexane, heptane, octane, isooctane, light naphtha fraction, etc. and mixtures thereof. As a further alternate the polymerization reaction may be initally carried out in the presence of one of the nonsolvents and upon completion of the polymerization reaction, the nonsolvent may be replaced with a solvent for the final polymer as set forth in U.S. Patent 2,988,527.

Concurrently or subsequently, a catalyst consisting of a Friedel-Crafts catalyst preferably dissolved in an alkyl halide of the type mentioned above is added to the mixture of the monomer and inert diluent, which has been preferably pre-chilled to a temperature of between about 30 to about —250° F., preferably between about —100 to about —180° F. The concentration of the Friedel-Crafts catalyst in the catalyst solution is generally in the range of 0.02–2.0 wt. percent, preferably 0.05 to 0.5 wt. percent. The preferred catalyst solution consists of aluminum trichloride dissolved in methyl chloride. However, other Friedel-Crafts compounds or complexes may be employed such as those disclosed by N. O. Calloway in the article entitled "The Friedel-Crafts Synthesis," printed in Chemical Reviews, vol. 17, No. 3, beginning on page 327.

The reactor may be of any type suitable for carrying out olefin polymerization reactions. Representative types of the latter which may be employed in this process include those shown in U.S. Patents 2,436,767, issued Feb. 24, 1948 to R. L. Gerlicher, 2,507,105, issued May 9, 1959 to F. A. Howard et al., 2,636,026, issued Apr. 21, 1953 to J. F. Nelson, 2,815,334, issued Dec. 3, 1957 to R. F. Killey et al. and 2,999,084, issued Sept. 5, 1961 to H. K. Arnold et al.

The polymerization reaction is carried out batchwise or on a continuous basis at temperatures in the range of about +30° F. to about —250° F. preferably between about —100° F. and about —180° F. These low temperatures may be maintained by either internal or external refrigeration by known methods. The residence time of the monomers in the reactor may vary from about 0.5 minute to 60 minutes, preferably from 8 minutes to 30 minutes. The pressure in the reaction zone may vary from subatmospheric to superatmospheric depending upon the reactor conditions and the reactor employed. However, the pressure is not a critical process condition and may be generally as low as 10 p.s.i.a. or as high as 250 p.s.i.a.

If desired, an appropriate amount of a modifier material may be added to the olefinic reactant material concurrently or prior to carrying out the polymerization reaction in order to obtain a polymer having any desired weight average molecular weight as disclosed in U.S. Patent 2,479,418, issued Aug. 16, 1959 to Henry G. Schutze and U.S. Patent 2,625,538, issued Jan. 13, 1953 to W. J. Sparks et al. which are incorporated herein by reference. These weight average molecular weight modifier materials may be employed in amounts ranging from 0.001 to 15 wt. percent, preferably 1 to 10 wt. percent, based on the amount of olefinic reactant materials. Suitable weight average molecular weight modifier materials include normal and branched monoolefins having 4 to 12 carbon atoms such as butene-1, butene-2, trimethylethylene, the dimer of propylene, diisobutylene, triisobutylene, the octenes, etc. and mixtures thereof.

The polymer which is produced in the reactor may be in the form of a slurry (i.e. a dispersion of substantially insoluble polymer particles) or a solution depending on whether the inert diluent chosen for the polymerization reaction is a nonsolvent or solvent for the polymer. After completion of the polymerization reaction, the polymer slurry or solution is then caused to flow into a flash drum wherein it is contacted with (a) steam to remove unreacted volatile reactants and diluents which may be purified by conventional methods and recycled to the reactor and with (b) hot water or a suitable solvent to slurry or dissolve the polymer. The polymer is then conventionally recovered by filtration, degassing, extrusion and drying or the like; if desired, the polymer may be blended with hydrocarbon blacks, fillers, extenders, oils, resins, waxes, asphalts and the like during or subsequent to the recovery procedures by methods well known in the prior art such as that disclosed in U.S. 2,988,527.

The resultant amorphous elastomeric polymer (the term "polymer" employed herein comprises homopolymers and copolymers of 4-methylpentene-1 and 4-methylhexene-1) has a weight average molecular weight which may vary from about 40,000 to several million. The polymer is subsequently dissolved in a suitable inert solvent and contacted, preferably with stirring, with halogenating agents which are preferably chlorinating or brominating agents. Suitable inert solvents include aromatic hydrocarbons such as benzene, toluene, naphthalene, xylene, etc.; aliphatic and cycloaliphatic hydrocarbons such as hexane, heptane, kerosene, naphtha, straight run mineral spirits, cyclopentadiene, cyclohexane, etc., or halogenated derivatives thereof such as chlorobenzene, dichlorobenzene, chloroform, carbon tetrachloride, methylchloride, ethylchloride, 1,1,2,2-tetrachloroethane, etc. When hydrocarbons are employed, some allowance will of course have to be made for the consumption of halogenating agent which occurs by virtue of the halogenation of the hydrocarbon solvent during the halogenation of the polymer. The concentration of the polymer in the inert solvent may vary from about 1 to about 15 wt. percent, preferably about 5 to about 10 wt. percent although lower or higher concentrations may be employed if desired.

The halogenating agent may be any of those commonly employed in halogenation reactions. For example, suitable halogenating agents include molecular chlorine, as well as compounds which liberate molecular chlorine such as alkali metal hypochlorites, preferably sodium hypochlorites, sulfur chlorides (particularly oxygenated sulfur chlorides), N-chlorosuccinimide, alpha-chloro-acetoacet-anilide, tri-chlorophenol chloride, N-chloroacetamide, beta-chloro-methyl phthalimide, N-chlorohydantoins, phosphorus pentachloride, N-chloroimides, N-chloroamides and other common chlorinating agents. Suitable brominating agents include molecular bromine or the compounds of bromine which liberate molecular bromine such as sodium hypobromite, N-bromosuccinimide, alpha-bromo-acetoacetanilide, beta-bromoethyl phthalimide, N-bromoacetamide, tri-bromophenol-brominate, bromo-beta-naphthol, etc. Iodination may be accomplished for example with the aid of molecular iodine (in conjunction with oxidizing agents such as nitric acid, mercuric oxide, ferric chloride, iodine monochloride, etc.).

Generally the halogenating agents are employed in an amount of about 10 to about 500 wt. percent, preferably about 20 to about 80 wt. percent based on the weight of the unhalogenated polymer. However, the amount of halogenating agent in the reaction medium is not critical; on the other hand, the amount of halogen to be combined with the polymer is critical, i.e. it must be over about 20 wt. percent (based on the weight of the halogenated polymer) in order that the halogenated polymer be solid and thermoplastic. Consequently, any concentration of halogenating agent may be used providing the reaction times and temperatures are such as to permit at least the minimum critical amount of halogen to be combined with the polymer. Preferably the halogenating agent is sulfuryl chloride, especially molecular gaseous chlorine. When molecular gaseous chlorine is employed as the halogenating agent, it is admitted into the inert solvent solution of the amorphous polymer at the rate of about 0.5 to about 3.5 grams of $Cl_2$ per minute per 0.1 to 0.5 gram of polymer. Neither the reaction temperature nor the reaction times nor the reaction pressures are critical for the halogenation reaction. The most useful reaction temperatures range from about 0° C. up to the boiling point of the inert solvent, preferably about 20° to about 80° C. The reaction time may vary from about 5 minutes to about 12 hours, preferably about 15 minutes to about 2 hours. The reaction temperatures and times are of course interdependent on th econcentration of the halogenating agent with respect to the polymer and may vary considerably from the ranges set forth above. The reaction pressures conventionally vary from atmospheric to about 200 p.s.i.g.; superatmospheric pressures, particularly when coupled with low reaction temperatures, are preferred with the halogenating agent for gaseous molecular chlorine since such reaction conditions tend to increase the solubility of gaseous chlorine in the inert solvent.

After recovery procedures well known in the prior art have been carried out (e.g. filtration, evaporation of the solvent, etc.), the resultant halogenated polymers which must have a combined halogen content of over about 20 wt. percent will have number average molecular weights ranging from about 10,000 to about 100,000 or more, particularly about 15,000 to about 40,000.

The preparation, properties and uses of the halogenated polymers of this invention are more fully set forth in the following examples which are intended as illustrative only since numerous modifications and variations will be apparent to those skilled in the art. In the examples, all parts, unless otherwise specified, are parts by weight.

EXAMPLE 1

The monomer, 4-methylpentene-1 (250 g.) was dissolved in 1600 ml. of methylchloride and the solution chilled to −78° C. The monomer was substantially free of any catalytic or molecular weight poisons. To the chilled monomer solution was added with stirring 35 ml. of a 2.3 wt. percent solution of aluminum trichloride in ethyl chloride which had been prechilled to −78° C. Reaction took place almost immediately and after a few minutes stirring, the reaction mixture was poured into hot water (about 80° C.) to flash off the diluents and 163 g. (64% conversion) of amorphous elastomeric poly-(4-methyl-pentene-1) having a molecular weight of about 201,000 was recovered.

EXAMPLE 2

Poly-(4-methylpentene-1) prepared in accordance with the procedures set forth in Example 1 was chlorinated with chlorine gas in accordance with the reaction conditions set forth in Table I. All of the chlorinations took place at atmospheric pressure.

TABLE I.—CHLORINATION OF AMORPHOUS ELASTOMERIC POLY-(4-METHYLPENTENE-1)

| Run Number | Polymer wt., g. | Polymer visc. average mol. wt. | Solvent | Conc. polym. in solvent, g./l. | Wt. percent $Cl_2$ gas added | Reaction time, hrs. | Reaction temp., °C. | Wt. percent Cl in chlor. polymer | Chlor. polymer visc. average mol. wt. | Chlor. polymer physical appearance |
|---|---|---|---|---|---|---|---|---|---|---|
| A | 1.6 | 201,000 | Benzene | 25.8 | 11 | 0.25 | 55 | 5.65 | | Rubbery. |
| B | 6.0 | 2,300,000 | CCl₄ | 10.0 | 58 | 0.5 | 21 | 8.29 | 500,000 | Do. |
| C | 4.6 | 2,300,000 | CCl₄ | 7.6 | 78 | 0.5 | 27 | 19.3 | 500,000 | Hard and flexible. |
| D | 3.5 | 2,300,000 | Benzene | 8 | 103 | 0.5 | 55 | 30.3 | | Do. |
| E | 5.0 | 2,300,000 | CCl₄ | 11 | 72 | 0.5 | 55 | 28.9 | 80,000 | Do. |
| F | 4.1 | 2,300,000 | Benzene | 7 | 103 | 0.5 | 21 | 18.2 | | Slightly rubbery. |
| G | 25.0 | 201,000 | do | 41 | 86 | 3.0 | 55 | 26.5 | 37,700 | Hard and flexible. |
| H | 25.0 | 201,000 | do | 36 | 54 | 2.0 | 42 | 23.4 | 63,300 | Do. |
| I | 25.0 | 201,000 | CCl₄ | 28 | 86 | 3.0 | 48 | 30.1 | | Very hard and flexible. |
| J | 230.0 | 170,500 | Benzene | 55 | 41 | 13.0 | 21 | 39.3 | 17,500 | Do. |

The results in Table I indicate that chlorinated poly-(4-methylpentene-1) having a combined chlorine content of over about 20 wt. percent is a relatively hard, tough, flexible material. In contrast, those chlorinated polymers having a combined halogen content of less than about 20 wt. percent were rubbery in nature and hence useless for molding applications demanding the use of thermoplastics.

EXAMPLE 3

The physical properties of two of the chlorinated polymers poly-(4-methylpentene-1) prepared in Example 2 are set forth in detail in Table II below:

TABLE II

| | Sample | |
|---|---|---|
| | G | J |
| General qualities | (1) | (2) |
| Density, g/ml | 1.07 | 1.10 |
| Rockwell Hardness (R scale) | 89.0R | 102R |
| Tensile, break p.s.i., 2 in./min. | 3,473 | 5,200 |
| Elongation, percent | 5.5 | 6–7 |
| Notched impact, ft./lb./in., room temp. | | 0.44 |
| Notched impact, ft./lb./in., −40° C. | | 3 |
| Heat distortion temperatures, °C. | | 43 |
| Vicat softening point, °C. | | 46 |
| Clarity | (3) | (3) |
| Burning rate | (4) | (4) |
| Molding qualities | (5) | (5) |
| Effect of organic solvents | (6) | (6) |

1 Very hard, flexible and thermoplastic.
2 Hard, flexible and thermoplastic.
3 Transparent.
4 Self-extinguishing.
5 Excellent.
6 Insoluble in heptane soluble in ether, benzene and CCl₄.

EXAMPLE 4

Poly-(4-methylhexene-1) was prepared in accordance with the procedures set forth in Example 1. The amorphous elastomeric polymer which resulted was thereafter chlorinated in accordance with the reaction conditions set forth in Table III below; all chlorinations took place at atmospheric pressure.

then contacted with a catalyst prepared from $Al(i-C_4H_9)_3$ and $TiCl_4$ (1:1 ratio of catalyst components) at 40° C. for about 4 hours (30:1 monomer to catalyst ratio). The resultant reaction mixture is poured into a methanol-isopropanol mixture (1:1) and after drying in vacuo, a precipitated, crystalline, isotactic polymer corresponding to a conversion rate of about 75% is obtained.

TABLE III.—CHLORINATION OF AMORPHOUS ELASTOMERIC POLY-(4-METHYLHEXENE-1)

| | Polymer wt., g. | Polymer visc. average mol. wt. | Solvent | Conc. polym. in solvent, g./l. | Wt. percent $Cl_2$ gas added | Reaction time, hrs. | Reaction temp., °C. | Wt. percent Cl in chlor. polymer | Chlor. polymer visc. average mol. wt. | Chlor. polymer physical appearance |
|---|---|---|---|---|---|---|---|---|---|---|
| Run Number: | | | | | | | | | | |
| K | 2.0 | 438,400 | Benzene | 22.7 | 31 | 0.08 | 21 | 3.40 | 16,500 | Soft, rubbery. |
| L | 2.0 | 438,400 | do | 22.7 | 121 | 0.33 | 21 | 18.1 | 23,700 | Tough, slight rubbery. |
| M | 2.0 | 438,400 | do | 22.7 | 181 | 0.50 | 21 | 27.5 | 58,000 | Hard, flexible. |
| N | 2.0 | 438,400 | do | 22.7 | 242 | 0.66 | 21 | 38.9 | 36,900 | Very hard, flexible. |
| O | 2.0 | 438,400 | do | 22.7 | 357 | 1.0 | 21 | 44.6 | | Do. |
| P | 2.0 | 438,400 | do | 22.7 | 538 | 1.5 | 21 | 51.1 | | Do. |

EXAMPLE 5

An elastomeric, amorphous copolymer of 4-methylpentene-1 and 4-methylhexene-1 was prepared in accordance with the procedures set forth in Example 1. Samples of the elastomeric, amorphous copolymer were then chlorinated in accordance with the reaction conditions set forth in Table IV; all of the chlorinations took place at atmospheric pressure.

The crystalline isotactic polymer was then halogenated in accordance with the procedures set forth in Example 2. It was noted that the crystalline isotactic polymer could only be slightly chlorinated due to its insolubility in the reaction diluent. Because of this insolubility, essentially only surface chlorination of the polymer occurred and consequently the chlorinated product was heterogeneous in nature, i.e. it consisted of a chlorinated skin over an

TABLE IV.—CHLORINATION OF 4-METHYLPENTENE-1/5-METHYLHEXENE-1 COPOLYMER

| | Polymer wt., g. | Solvent | Conc. polym. in solvent, g./l. | Wt. percent Cl gas added | Reaction time, hrs. | Reaction temp., °C. | Wt. percent Cl in chlor. polymer | Chlor. polymer visc. average mol. wt. | Chlor. polymer physical appearance |
|---|---|---|---|---|---|---|---|---|---|
| Run Number: | | | | | | | | | |
| Q | 1.4 | Benzene | 15.3 | 43.5 | .08 | 21 | 7.34 | 19,000 | Soft, rubbery. |
| R | 1.4 | do | 15.3 | 87.1 | .17 | 21 | 6.63 | 18,200 | Do. |
| S | 1.4 | do | 15.3 | 173 | .33 | 21 | 14.0 | 44,000 | Very tough, rubbery. |
| T | 1.4 | do | 15.3 | 259 | .50 | 21 | 39.7 | 24,800 | Hard, flexible. |
| U | 1.4 | do | 15.3 | 346 | .66 | 21 | 44.8 | 14,100 | Hard white solids. |
| V | 1.4 | do | 15.3 | 436 | .83 | 21 | 48.7 | 5,900 | Do. |
| W | 1.4 | do | 15.3 | 570 | 1.0 | 21 | 49.0 | 6,400 | Do. |

EXAMPLE 6

Crystalline isotactic poly-(4-methylpentene-1) was prepared by the anionic coordinated polymerization of 4-methylpentene-1 in accordance with the procedures set forth in the prior art. See for example, The Journal of Polymer Science, volume 45, page 509 et seq. (1960), and The Journal of Applied Polymer Science, volume 5, page 184 et seq. (1961). These procedures make use of a monomer (in this case, 4-methyl-pentene-1 of 95+ mole percent purity) dissolved in heptane and the solution is unchlorinated core. As will be seen from the Table V set forth below, the physical properties of this plastic are completely unacceptable for molding operations.

In contrast thereto, the amorphous elastomeric poly-(4-methylpentene-1) prepared by cationic polymerization of 4-methylpentene-1 as set forth in Example 1 was satisfactorily chlorinated in accordance with the procedures set forth in Example 3 to yield a homogeneous thermoplastic having excellent molding properties.

TABLE V

| | Sample [1] | |
|---|---|---|
| | G | X |
| | Properties | |
| | (Chloro-poly-4-methylpentene-1 from the chlorination of amorphous elastomeric poly-(4-methyl-pentene-1)) | (Chloro-poly-4-methylpentene-1 from the chlorination of crystalline isotactic poly-(4-methyl-pentene-1)) |
| Solubility of starting polymers in benzene | Soluble | Insoluble. |
| Appearance | Tough, white mass | White powder. |
| Wt. percent chlorine up-take | 26.5 | 0.64. |
| Mole wt. | 37,700 | Indeterminable due to insolubility. |
| Moldability (250–300° F.) | Excellent | Discolored, heterogeneous molds. |
| Clarity | Optically clear | Cloudy. |
| Burning rate | Self-extinguishing | Burns readily. |
| Density (g./ml.) | 1.072 | Heterogeneous substance. |
| Effect of organic solvents | Soluble in ether, benzene, $CCl_4$; Insoluble in heptane. | Partially soluble in benzene, $CCl_4$. |
| Tensile, p.s.i. | 4,073 | Due to heterogeneity of molded pads, meaningful physical properties could not be obtained. |
| Elongation, percent | 4.1 | |
| Tensile break, p.s.i. | 3,473 | |
| Elongation, percent | 5.5 | |

[1] Both samples were halogenated under identical reaction conditions.

What is claimed is:
1. A halogenated, thermoplastic polymer containing greater than about 20 wt. percent halogen, based on the weight of the polymer, prepared by halogenating a polymer selected from the group consisting of:
(a) amorphous, elastomeric poly-4-methylpentene-1 having the repeating unit

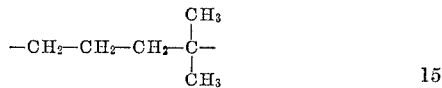

(b) amorphous, elastomeric poly-4-methylhexene-1 having the repeating unit

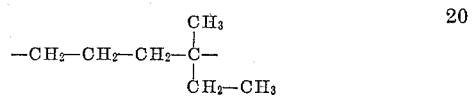

and
(c) amorphous, elastomeric copolymers of 4-methylpentene-1 and 4-methylhexene-1 having the repeating units

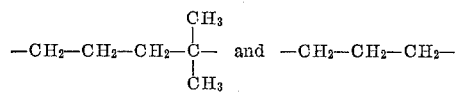

2. The halogenated thermoplastic polymer of claim 1 wherein the halogen content is about 25 to about 50 wt. percent, based on the weight of the polymer.

3. The halogenated thermoplastic polymer of claim 1 wherein the underlying polymer to be halogenated is amorphous, elastomeric poly-4-methylpentene-1 having the repeating unit

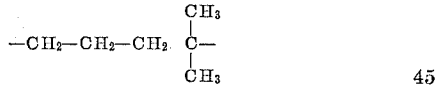

4. A process for preparing a halogenated, thermoplastic polymer which comprises:
(a) dissolving, in an inert diluent, a polymer selected from the group consisting of (1) amorphous, elastomeric poly-4-methylpentene-1 having the repeating unit

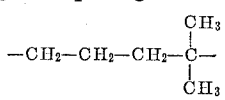

(2) amorphous, elastomeric poly-4-methylhexene-1 having the repeating unit

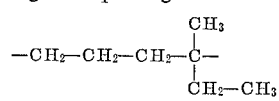

(3) amorphous, elastomeric copolymers of 4-methylpentene-1 and 4-methylhexene-1 having the repeating units

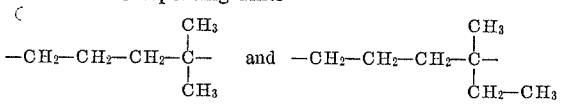

(b) contacting the resultant inert diluent solution with a halogenating agent under conditions sufficient to result in the production of a polymer containing greater than about 20 wt. percent halogen, based on the weight of the halogenated polymer; and
(c) recovering the resultant polymer.

5. The process of claim 4 wherein the halogenation is carried out under conditions sufficient to permit the production of a thermoplastic polymer having a halogen content in the range of about 25 to about 50 wt. percent based on the weight of said polymer.

6. The process of claim 4 wherein the underlying polymer to be halogenated is elastomeric, amorphous poly-4-methylpentene-1 having the repeating unit

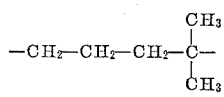

References Cited

UNITED STATES PATENTS

| | | | |
|---|---|---|---|
| 3,317,500 | 5/1967 | Edwards | 260—93.7 |
| 3,317,501 | 5/1967 | Edwards | 260—93.7 |
| 3,180,856 | 4/1965 | Szalla et al. | 260—93.7 |

JOSEPH L. SCHOFER, Primary Examiner

JOHN A. DONAHUE, Jr., Assistant Examiner

U.S. Cl. X.R.

260—93.7